F. D. KENDRICK.
SLED ATTACHMENT FOR PERAMBULATORS.
APPLICATION FILED JAN. 12, 1917.
1,233,792.    Patented July 17, 1917.
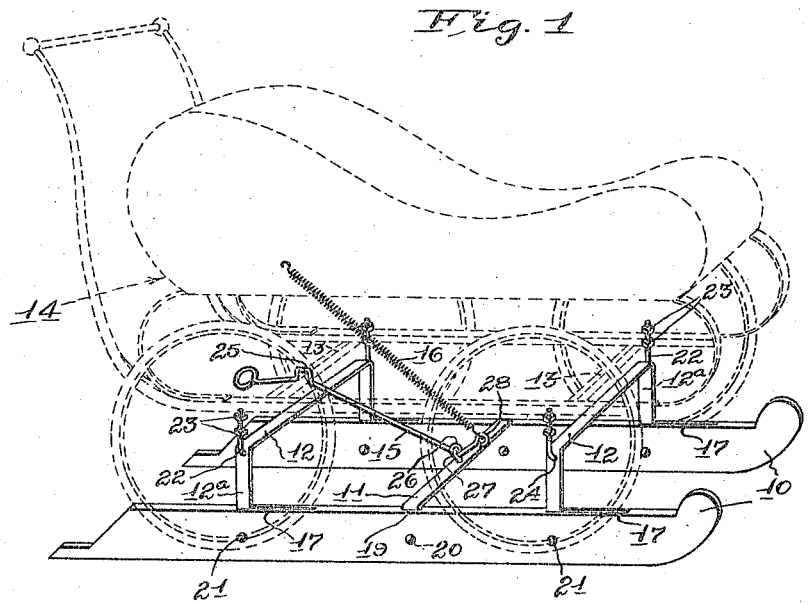
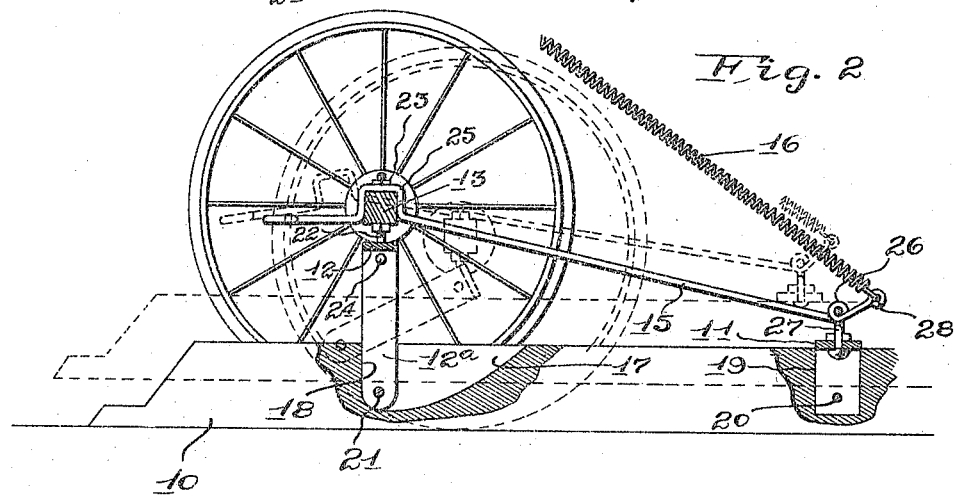
Inventor
Fayette D. Kendrick
by John E. Dryden atty.

UNITED STATES PATENT OFFICE.

FAYETTE D. KENDRICK, OF ST. PAUL, MINNESOTA.

SLED ATTACHMENT FOR PERAMBULATORS.

1,233,792.

Specification of Letters Patent.  Patented July 17, 1917.

Application filed January 12, 1917. Serial No. 142,089.

*To all whom it may concern:*

Be it known that I, FAYETTE D. KENDRICK, a citizen of the United States, residing at St. Paul, in the county of Ramsey and State of Minnesota, have invented new and useful Improvements in Sled Attachments for Perambulators, of which the following is a specification.

The object of my invention is to provide an inexpensive, light and durable sled attachment adapted to be removably mounted upon the axles of a wheeled perambulator and designed to be quickly and easily thrown into and out of service position, so that the perambulator may be instantly converted into a sled or carriage, as desired.

A further object is to provide a device of this kind having means to yieldingly hold the sled in elevated inoperative position, said means being also adapted to yieldingly secure the sled latching mechanism when said sled is in position for service.

In the drawings, Figure 1 is a perspective view, illustrating in solid lines my improved device and in dotted lines a wheeled perambulator to which said device is attached; and Fig. 2 is an enlarged detail longitudinal central sectional view, taken through the rear axle of the perambulator.

Referring to the drawings, it will be seen that my sled attachment comprises a pair of runners 10 joined by means of a tie brace 11 and U-shaped links 12, the latter being connected with said runners and attached to the axles 13 of a carriage 14. A latching member 15 on the sled engages the rear axle of the carriage and secures said sled in operative position. This latching member is connected with a tension spring 16 which is secured to the body of the carriage 14 and serves two functions, viz: to yieldingly hold the sled in elevated position when out of service and to yieldingly secure the latching member 15 in engagement with the rear axle of the carriage when the sled is depressed for use.

The runners 10 are identical, each runner being formed with kerfs 17, near its ends, having upright rear abutments 18 and intermediate kerfs 19. The tie brace 11 is U-shaped and the ends thereof are seated in the kerfs 19 and rigidly secured to the runners by means of rivets or bolts 20. The links 12 are also U-shaped, the legs 12ª thereof being inserted in the kerfs 17 in the runners 10 and pivotally secured therein by means of rivets or bolts 21 passing through said legs and runners. The connections between the links 12 and axles 13 consist of L-shaped bolts or clips which pass through perforations in the axles of the carriage and are secured to said axles by means of nuts 23. Each pair of clips serves as alined journals 24 upon which one of the links 12 is mounted. These links swing from pendant position to rearwardly inclined position (Fig. 2). In the former position the runners 10 are depressed and support the carriage, the wheels thereof being held above the ground; while in the latter position of said links the runners are elevated, the carriage then being supported upon said wheels.

The latch member 15 comprises a rod which is bent near the rear end thereof to form a catch 25 and near its forward end looped to form an eye 26. An eye bolt 27, secured at the center of the tie bar 11, passes through said eye 26 and pivotally secures the rod 15 upon the sled. The spring 16 is secured at its lower end in a second eye 28 on the forward end of the rod 15 and passes upwardly and rearwardly to a point beneath the body of the carriage where it is secured to said body by means of a screw eye (not shown) or other suitable means. This spring supports the sled when not in service in elevated position (dotted lines, Fig. 2) and also holds the rear end of the rod 15 against the rear axle 13 of the carriage, thereby preventing the rod from rattling and also yieldingly securing the catch 25 on said rod in engagement with said axle (Fig. 2) when the sled is depressed for service. The simplicity of my device, the ease with which it may be manipulated and its convenience of application to a carriage constitute important features of the present invention.

Having described my invention, what I claim as new and desire to protect by Letters Patent, is:

1. In a device of the character described, the combination with a carriage, of a sled arranged beneath the axles of said carriage, links connecting said sled with said axles and adapted to hold the sled in service position and also in elevated position, so that said carriage may be carried upon the sled or upon the wheels, a latching member mounted on said sled and designed to engage an axle of said carriage and a tension spring, secured to said carriage and latching member, adapted to yieldingly hold the sled in elevated position and also to yieldingly secure said latching member in engagement with said axle, when the sled is in position for service.

2. In a device of the character described, the combination with a carriage, of a sled, connecting links pivotally suspending said sled beneath the axles of the carriage, a tension spring, interposed between the carriage and sled, to yieldingly hold the latter in elevated position, a latching member having a medial pivotal connection with said sled, one end of said member being connected with said spring, while the other end thereof has a slidable bearing upon an axle of the carriage and a catch on said latching member adapted to engage said axle and thereby secure the sled in position for service.

Whereof, I have hereunto subscribed my name to this specification.

FAYETTE D. KENDRICK.

Copies of this patent may be obtained for five cents each, by addressing the "Commissioner of Patents, Washington, D. C."